US012339203B2

(12) United States Patent
Boies et al.

(10) Patent No.: US 12,339,203 B2
(45) Date of Patent: Jun. 24, 2025

(54) SEMI-VOLATILE PARTICULATE MATTER DETECTION

(71) Applicants: Cambridge Enterprise Limited, Cambridge (GB); Technische universität Graz, Graz (AT)

(72) Inventors: Adam Boies, Cambridge (GB); George Giannopoulos, London (GB); Alexander Bergmann, Graz (AT); Markus Bainschab, Villach (AT)

(73) Assignees: Cambridge Enterprise Limited, Cambridge (GB); Technische Universität Graz, Graz (AT)

( * ) Notice: Subject to any disclaimer, the term of this patent is extended or adjusted under 35 U.S.C. 154(b) by 472 days.

(21) Appl. No.: 17/775,833

(22) PCT Filed: Nov. 11, 2020

(86) PCT No.: PCT/EP2020/081776
§ 371 (c)(1),
(2) Date: May 10, 2022

(87) PCT Pub. No.: WO2021/094383
PCT Pub. Date: May 20, 2021

(65) Prior Publication Data
US 2022/0381658 A1   Dec. 1, 2022

(30) Foreign Application Priority Data

Nov. 11, 2019   (GB) ..................................... 1916387

(51) Int. Cl.
*G01N 1/40*   (2006.01)
*G01N 1/22*   (2006.01)
*G01N 15/06*   (2006.01)

(52) U.S. Cl.
CPC ......... *G01N 1/4022* (2013.01); *G01N 1/2252* (2013.01); *G01N 15/0618* (2013.01); *G01N 2001/4033* (2013.01)

(58) Field of Classification Search
None
See application file for complete search history.

(56) References Cited

U.S. PATENT DOCUMENTS

| 6,192,766 B1 | 2/2001 | Gårdhagen et al. |
| 9,744,490 B1 | 8/2017 | Novosselov et al. |
| (Continued) | | |

FOREIGN PATENT DOCUMENTS

| CN | 105865853 A | 8/2016 |
| CN | 106124712 A | 11/2016 |
| (Continued) | | |

OTHER PUBLICATIONS

PCT International Search Report and Written Opinion dated Feb. 23, 2021, PCT/EP2020/08177.
Search report from UKIPO dated Apr. 28, 2020, GB1916387.2.

*Primary Examiner* — Richard C Gurtowski
(74) *Attorney, Agent, or Firm* — Rudy J. Ng; Bozicevic, Field & Francis LLP

(57) ABSTRACT

A semi-volatile particulate matter detection device is disclosed for detecting semi-volatile particulate matter in a gas flow. The device has a first filter stage for receiving the gas flow, the first filter stage being configured to capture particulate matter and to be heated to a temperature of at least 150° C. to volatilise semi-volatile particulate matter to produce semi-volatile vapour for passing through the first filter stage with the gas flow. The device also has a conveyance section downstream of the first filter stage to convey the gas flow and the semi-volatile vapour. A second filter stage is configured to receive the flow from the conveyance section. The temperature of the conveyance section and/or of (Continued)

the second filter stage is controllable so as to cause condensation of at least some of the semi-volatile vapour and collect it on the second filter stage. A detector is provided for detecting at least one characteristic of the condensed semi-volatile vapour on the second filter stage.

16 Claims, 19 Drawing Sheets

(56) References Cited

U.S. PATENT DOCUMENTS

| | | |
|---|---|---|
| 2005/0016300 A1 | 1/2005 | Mansson et al. |
| 2010/0163761 A1 | 7/2010 | Febo |
| 2013/0136656 A1* | 5/2013 | Okada ............... G01N 33/0016 422/52 |
| 2016/0231221 A1 | 8/2016 | Twigg |
| 2018/0133744 A1 | 5/2018 | Gorbunov et al. |

FOREIGN PATENT DOCUMENTS

| | | |
|---|---|---|
| CN | 108801718 A | 11/2018 |
| WO | WO0014518 A1 | 3/2000 |

\* cited by examiner

SEMI-VOLATILE PARTICULATE MATTER DETECTION

FIELD OF THE INVENTION

The present invention relates to the detection of semi-volatile particulate matter and particularly, although not exclusively, to the detection of one or more characteristics of such particulate matter such as mass concentration in a flowing gas.

BACKGROUND

Regulators are becoming increasingly stringent on emissions and air pollution, seeking to define additional standards for semi-volatile pollutants. The term "semi-volatile compounds" refers to organic compounds that possess Henry's law constants (H) in the range of $10^{-5}$-$3 \times 10^{-7}$ atm×m$^3$/mol and demonstrate higher boiling points, usually greater than that of water with correspondingly low vapor pressure from $10^{-14}$-$10^{-4}$ atm. The "semivolatile" contaminant grouping is composed of compounds with broad chemical properties and structural features. Examples of semivolatiles compounds include hydrocarbons, aldehydes, ethers, esters, phenols, organic acids, ketones, amines, amides, nitroaromatics, PCBs (also known as Aroclors), PAHs, phthalate esters, nitrosamines, haloethers and trihalomethanes.

Air pollution is among the world's leading challenges and is one of the top ten causes of death worldwide [1]. Specifically, particulate matter (PM) represents a significant health risk with known health effects. Exposures to PM less than 2.5 µm in diameter (PM2.5) and ultrafine particles (definitions vary, usually particles smaller than 0.1 µm) have been proposed as possible predictors of health outcomes related to cardiovascular disease (CVD), asthma, and diabetes. Many studies have shown a link between exposure to PM2.5 and adverse health effects [2-4]. Among known common air pollutants the association between PM and adverse health effects is known to be the strongest. A number of studies indicate that ultrafine particles are causally related to adverse health effects [5-8]. Due to the adverse health impacts of PM, particle monitoring is required in all industrialized countries and for every vehicle model sold in North America or the EU. Currently, EU regulations of emissions focus only on solid particle number (PN), requiring each vehicle sold to emit less than a regulated number of particles per km driven. Likewise, many atmospheric air quality measurement devices measure black carbon (solid particles). Currently no nanoparticle measurement device exists for the reliable detection of semi-volatile particle mass, despite the known emissions that can sometimes exceed solid particles. Because of the lack of semi-volatile particle measuring devices, semi-volatiles are not a part of emissions regulations, despite the desire by the EU and US to regulate them. The health impacts of semi-volatile particles are unknown, but most semi-volatile material are known to be lipid soluble. Semi-volatile material dissolves in the body upon inhalation, and thus it is hypothesized that mass rather than particle number or surface area is the most relevant metric for semi-volatile material.

The current European emissions standards leave a large fraction of emissions unregulated, by excluding all volatile and semi-volatile particles. The impact of these semi-volatile particles are unknown, but likely include direct health impacts and encourage indirect means of pollution through the formation of secondary aerosols. Current emissions regulations require semi-volatile particles with effective diameters >23 nm to be removed from the exhaust stream during detection of solid particle number. The regulation of solid particles has historically made particle number standards more robust, but omits the significant impact that semi-volatiles might have.

Existing devices include aethalometers which provide a measure of black carbon by collecting solid particles on a filter and measuring the transmission of visible light through a filter to detect particle mass. A catalytic stripper removes semi-volatiles for subsequent solid particle number detection. Aerosol mass spectrometers give a chemical signature of aerosol components within a given aerodynamic size range, but require expensive vacuum components and do not provide a total mass measurement of all species.

It has been demonstrated that organic particle mass concentrations determined by deposition on filters and FTIR analysis are in good linear relation with organic particle mass concentrations determined using an aerosol mass spectrometer [10]. However, this method and others (e.g. flame ionization detectors) can only be used to determine the total concentration of hydrocarbons, but lack the ability to determine the concentration of semi-volatile organic compounds independently. Also filter mass measurements do not provide continuous signal for the semi-volatile particle mass.

Moreover, a recent publication discloses a device which aims to collect semi-volatile particles on a back filter, however it does not include a detection component in its design [11]. In this device there is no temperature control, or dilution system to ensure that semi-volatiles do not condense on the walls of the device.

The present invention has been devised in light of the above considerations.

SUMMARY OF THE INVENTION

The invention includes the combination of the aspects and preferred features described except where such a combination is clearly impermissible or expressly avoided.

According to a first aspect of the invention, there is provided a semi-volatile particulate matter detection device for detecting semi-volatile particulate matter in a gas flow, the device having:
  a first filter stage for receiving the gas flow, the first filter stage being configured to capture particulate matter and to be heated to a temperature of at least 150° C. to volatilise semi-volatile particulate matter to produce semi-volatile vapour for passing through the first filter stage with the gas flow;
  a conveyance section downstream of the first filter stage to convey the gas flow and the semi-volatile vapour;
  a second filter stage configured to receive the flow from the conveyance section, wherein the temperature of the conveyance section and/or of the second filter stage is controllable so as to cause condensation of at least some of the semi-volatile vapour and collect it on the second filter stage; and a detector for detecting at least one characteristic of the condensed semi-volatile vapour on the second filter stage.

Advantageously, the semi-volatile particulate matter detection device enables detection of semi-volatile species.

The first filter stage filters particulate matter at high temperature. Accordingly, the particulate matter captured at the first filter stage may be non-volatile particulate matter, whether solid or liquid. In operation, the temperature of the first filter stage is at least 150° C., for example the temperature of the first filter stage may be at least 200° C., or at least 250° C. Preferably, the temperature of the first filter stage is at least 300° C., such as 350° C., which temperature is widely accepted as a threshold for semi-volatiles. In operation, the first filter stage may be at a temperature of at least 400° C., at least 450° C. or at least 500° C. By filtering at high temperature, any semi-volatile particulate matter in the captured solid or liquid particulate matter is volatilised to form semi-volatile vapour. Furthermore, it is preferred that this volatilisation takes place even before reaching the first filter. The semi-volatile vapour can then pass through the first filter stage. Additionally the gas entering the device may be heated before reaching the first filter stage to evaporate water in the gas.

The semi-volatile vapour condenses onto the second filter stage and may be collected by the second filter stage. The second filter stage may cooled, either actively or passively. Preferably the temperature of the second filter stage is 50° C. or lower, such as at most 40° C., or at most 30° C. Typically the temperature of the second filter stage is about 20° C., but it may be a lower temperature, such as about 10° C. Any remaining gas-phase volatile hydrocarbons pass through the cooled second filter stage because, by definition, volatile material does not condense at these temperatures.

The temperature of the second filter stage may also be tuneable from 0° C. up to 800° C. For example, the filter may be tuned to 100° C., 200° C., 300° C., 400° C., 500° C., 600° C. or 700° C. The purpose of heating the second filter stage is to bake the condensed semi-volatile particulate matter on the filter so the condensed semi-volatile particle is evaporated away or burned off, so that the filter can be re-used. In this manner, the device can be configured to be self-cleaning. In one approach, the temperature of the second filter stage can be controlled by raising the inlet temperature of the gas to the second filter stage, optionally in coordination with not carrying out cooling of the second filter stage. This serves to reduce complications of excessive build-up of semi-volatile material and eliminates the need for filter tape systems that progressively replace the filter medium, as in aethalometers.

The semi-volatile material may be deposited on the second filter at a collection spot. The device may be configurable to adjust the size of the collection spot. This is advantageous to allow concentration in low pollution environments to enhance the signal. In a typical operation of the device, the temperatures of the first and second filter stages, and of the conveyance section, may be measured and reported.

The filter efficiency of one or both of the first and second filters is tunable by changing porosity of the filters and the gas flow rate in the device. The porosity of the first filter stage allows for filtering of non-volatile (solid or liquid) particles and may have an average pore size in the range of less than 1 nm to about 10 μm. Suitable average pore sizes for filtering typical solid PM will be well understood. The average pore size of the second filter stage is selected to allow for filtering of semi-volatile species after condensation. The gas flow rates can be varied from 1 standard cubic centimetre per minute (sccm) to 100 litres per minute (lpm) with a typical operation at 1 lpm.

Advantageously, the detector measures the total mass of semi-volatile material captured at the second filter stage. This is in preference to measuring the number of particles captured, or the particle size or surface area of the particles captured. Measuring the total mass of semi-volatile material enables regulation of semi-volatile pollution, and allows for scientific and regulatory measurement of exhaust emissions and ambient semi-volatile pollution. In particular, the detector corresponds to suggested guidelines for post Euro6 emissions regulations by the ICCT in Europe to "Develop a methodology to measure volatile and semi-volatile particles" [9]. In some embodiments, detection of the total mass of semi-volatile material may be achieved with scattering and attenuation of light that is proportional to the mass of absorbed semi-volatile material on the first and second filter stages [10]. In some embodiments, detection of the total mass of semi-volatile material may be carried out by weighing of the second filter. This is advantageous in that it is straightforward, but may not be preferred in some circumstances because it does not typically permit continuous real-time monitoring.

Preferably, the conveyance section is subjected to active cooling in order to reduce the temperature of the gas flow and entrained semi-volatile particulate matter vapour. The conveyance section provides a pathway for the semi-volatile vapour to travel from the first filter stage to the second filter stage. Therefore, there is a negative temperature gradient from the first filter stage, which may be at a temperature of a least 150° C., to the second filter stage, which may be at a temperature of less than 50° C. The conveyance section advantageously aids in creating this negative temperature gradient, and aids in the condensation of the semi-volatile particulate vapour on the second filter stage. This is because the rate of cooling of the vapour affects the condensation of the semi-volatile species. The cooling of the conveyance section may therefore be monitored and controlled such that the semi-volatile species are collected on the filter(s) rather than the conveyance section interior walls. This process is governed by the ratio of thermal to mass diffusivity, known as the Lewis number.

The second filter stage may be subjected to active cooling in order to reduce the temperature of the gas flow and entrained semi-volatile particulate matter vapour. For example, the second filter stage may comprise a cooler. Cooling the second filter stage advantageously allows the semi-volatile particulate matter vapour to condense onto the second filter stage so that the semi-volatile particulate matter vapour can be detected.

The conveyance section may be operable to provide a gas sheath around the gas flow and entrained semi-volatile particulate matter vapour in order to reduce or prevent condensation of the semi-volatile particulate matter vapour onto walls of the conveyance section. A gas sheath may be provided axially along at least part of the conveyance section so that it provides a boundary between the interior walls of the conveyance section and the internal, main gas sample flow. Alternatively, a radial flow can be introduced through the walls of a porous tube constituting at least a part of the conveyance section, to form the gas sheath. The gas sheath may comprise warm(ed) filtered air.

As mentioned above, the detected characteristic of the condensed semi-volatile particulate matter vapour on the second filter stage may be the mass of the condensed semi-volatile particulate matter vapour. The mass of the condensed semi-volatile particulate matter vapour may be measured by removing the second filter stage and weighing externally, for example by thermogravimetric analysis (TGA). Alternatively, the mass may be measured in situ by using an optical detector and using optical characteristics, for example the attenuation of light at wavelengths of 200 nm to 5 μm, as the light is transmitted through or reflected from a filter holding the condensed semi-volatile particulate matter. The optical characteristic can include a rate of change, such as a rate of change in the amount of light transmitted through the second filter. For example, measurements can be made by photodetectors at successive regular time intervals. The increase in attenuation from one measurement to the next is proportional to the increase in the density of optically absorbing material in the filter, which in turn, is proportional to the mass concentration of the material in the sampled air stream. The mass concentration at a given time can be derived from this signal using an appropriate algorithm. Another suitable detection method using light may detect the condensed semi-volatile vapour on the second filter stage by means of multi-angle detection of both reflected and transmitted light, including noting the angle of detection. A further detection method using light may be using a filter medium, for example quartz, as a waveguide to transmit the light and detect the condensed semi-volatile material on the surface of the quartz filter. Additionally or alternatively, the detector can be a mass sensor, such as a quartz crystal microbalance (QCM).

The detector may include a Fourier Transform Infrared (FTIR) detector to measure how much light (including IR) the condensed semi-volatile particulate matter vapour absorbs at each wavelength. An IR source may be positioned annularly around the second filter stage. The IR source may emit an IR beam of a specific combination of frequencies at the condensed semi-volatile particulate matter vapour and the amount of absorption of the beam by the condensed semi-volatile particulate matter vapour may be measured. An advantage of using FTIR to measure the mass of the condensed semi-volatile particulate matter vapour is that measurement can be completed in stages, for example, a first stage may be measurement of absorption of an IR beam of a specific combination of frequencies, and a second stage may be measurement of absorption of an IR beam of a different combination of frequencies. Many measurements for different combinations of frequencies can be collected to determine the absorption of IR at each wavelength, and IR spectral measurements can be acquired in real time.

The device may also comprise a third filter stage, downstream of the second filter stage, wherein the second and third filter stages are configured to be at different temperatures in order to capture different semi-volatiles. There may also be further filter stages in the device, for example, a fourth or fifth or sixth filter stage may be present. These are typically provided also at different temperatures. Having a multi-stage detection device advantageously allows the semi-volatile particulate matter to be separated into different species according to volatility, by controlling the temperature of each of the filter stages. For example, the filter stages could be configured to operate at successively lower temperatures, so that the mass of hydrocarbons of different volatilities can be distinguished. The mass of each species of semi-volatile matter collected on each filter may be measured.

The device may comprise an inlet section which is subjected to water vapour removal using diffusion based drying. Water molecules typically have a higher diffusivity than the semi-volatile species of interest, this difference allowing removal of the water from the gas flow using a diffusion based dryer such as a Nafion dryer.

In some embodiments, the semi-volatile material may be evaporated before reaching the first filter stage. A coil heater may be used to heat the gas flow. The coil heater may be operated at approximately 350° C. The coil heater may also be operated at temperatures higher than 350° C.

According to a second aspect of the invention, there is provided a method for detecting semi-volatile particulate matter in a gas flow, the method including the steps:
conducting the gas flow to a first filter stage, the first filter stage capturing particulate matter from the gas flow and the first filter stage being heated to a temperature of at least 150° C. to volatilise semi-volatile particulate matter to produce semi-volatile vapour which passes through the first filter stage with the gas flow;
conveying the gas flow and the semi-volatile vapour along a conveyance section downstream of the first filter stage;
receiving the flow at a second filter stage, wherein the temperature of the conveyance section and/or of the second filter stage is controlled so as to cause condensation of at least some of the semi-volatile vapour onto the second filter stage; and detecting at least one characteristic of the condensed semi-volatile vapour on the second filter stage.

The gas may be an exhaust gas from a combustion process, such as from combustion of a fuel such as a fossil fuel.

The exhaust gas may consist of air and one or more of: hydrocarbons, sulphur compounds, nitrates, secondary organic aerosols, and incidental additional species.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
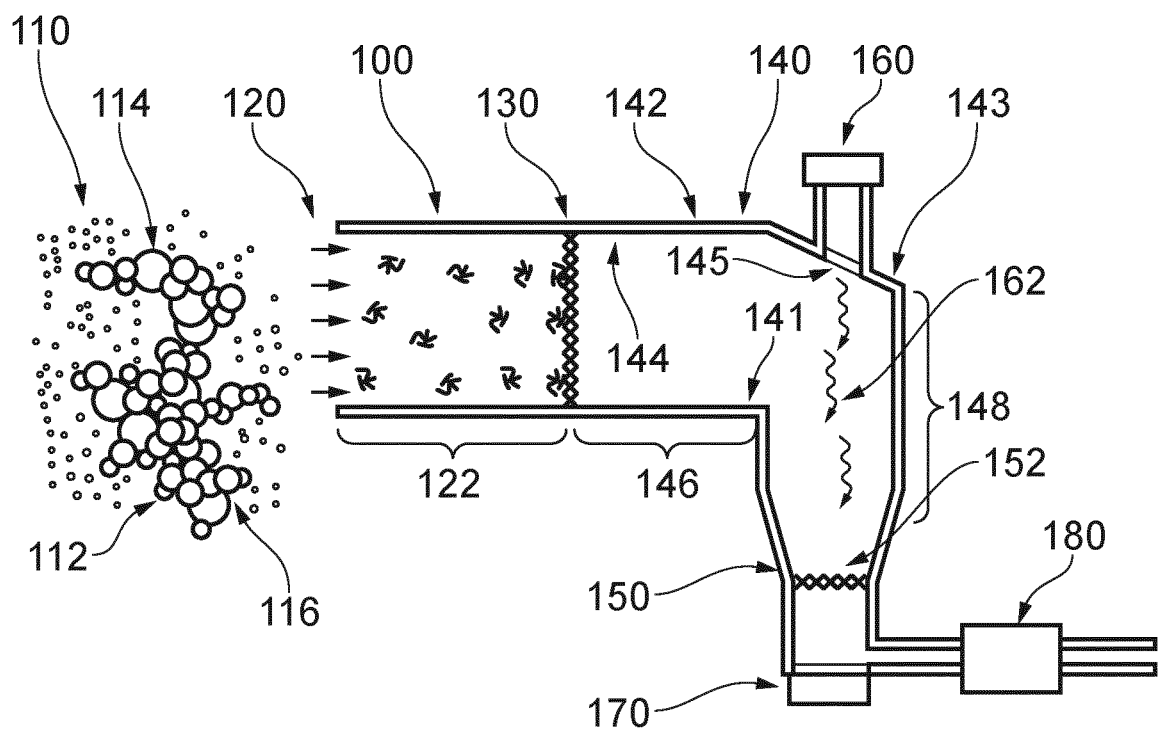
FIG. 1 is a schematic cross sectional side view of a first embodiment of the present invention.

FIG. 1 is a schematic showing a semi-volatile mass detector 100. The semi-volatile mass detector 100 detects nano-particulate semi-volatile material in exhaust gas 110. The semi-volatile material may be air-borne as a semi-volatile gas 112, or solid 114 and absorbed onto soot particles 116. The exhaust gas 110 comprising semi-volatile material 112, 114 enters the detector by an inlet 120 and semi-volatile material passes through an inlet section 122. The inlet section terminates in a first filter stage 130. Optionally, water is removed from the inlet gas using a diffusion dryer (not shown). The temperature of the inlet section 122 increases from the inlet 120 to the first filter stage 130. The first filter stage 130 is heated to approximately 350° C. and allows the semi-volatile gas 112 generated by volatilising the semi-volatile particulate matter to pass through the filter 130. The solid particles 114, 116 in the exhaust gas 110 (and any non-volatile liquid particles) are filtered out by the first filter stage 130. The semi-volatile gas 112 which has passed through the first filter stage 130 enters a conveyance section 140 having outer walls 142 and inner walls 144. The conveyance section 140 consists of two parts. In the first part 146, the semi-volatile gas travels in a direction approximately aligned with the gas flow direction at the first filter stage. In the second part 148, the semi-volatile gas travels in a direction approximately perpendicular to the gas flow direction in the first part 146. Between the first and second parts 146, 148, there is an interior corner 141 and an exterior corner 143, so that the conveyance section 140 is predominately "L-shaped" which permits the positioning of an optical detector, described later. Note that in other embodiments it is not necessary for there to be a change of direction of the gas flow in the conveyance section, and indeed in some embodiments it may be preferred not to have such a change of direction.

The conveyance section 140 terminates in a second filter stage 150. The inner walls 144 of the second part 148 of the conveyance section are cooled so that the semi-volatile gas condenses to form semi-volatile particles. The second filter stage 150 is cooled so that the semi-volatile gas condenses onto the filter as semi-volatile particles 152.

Detection of the mass of semi-volatile particles on the second filter stage 150 is achieved optically in this embodiment. A light source 160 is fitted to the sloping exterior corner 143 of the conveyance section 140, and an aperture 145 is positioned in the sloping exterior corner 143 such that light 162 from the light source 160 can pass through both the inner and outer walls 142, 144 of the conveyance section 140. The light 162 from the light source 160 can then pass in a direction perpendicular to the position of the second filter stage 150, and pass through the second filter stage 150 to a detector 170 downstream of the second filter stage. The amount of light that is transmitted through the second filter stage 150 is reduced by the presence of semi-volatile particles 152 on the second filter stage 150. The optical detector 170 detects the light transmitted through the second filter, and this information is used to calculate the mass of semi-volatile particles which has condensed onto the second filter 150. A pump 180 is positioned downstream of the second filter to draw the exhaust gas 110 from the inlet through the first filter stage 130 and through the second filter stage 150.

Figure 2:
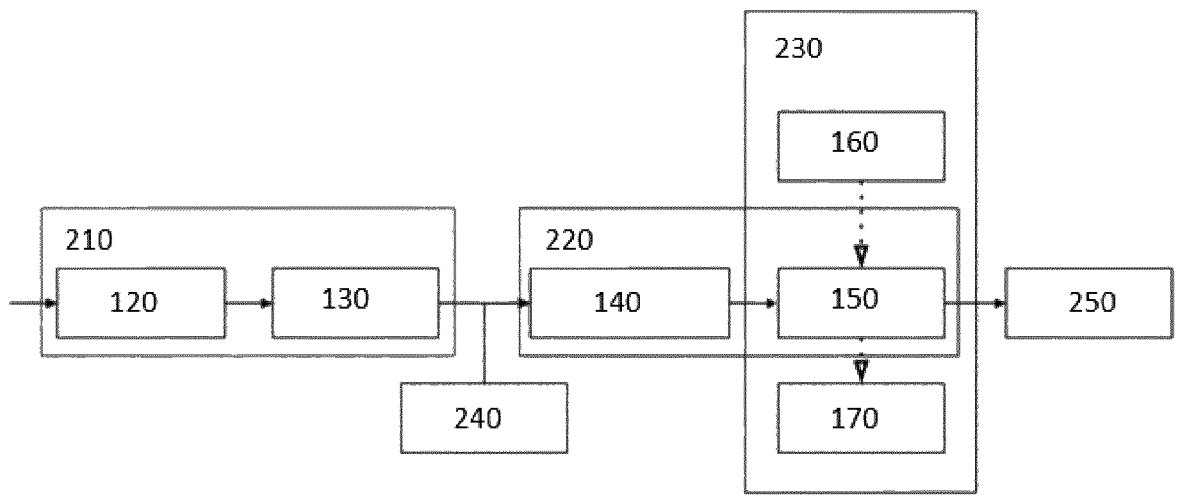
FIG. 2 is a schematic of a second embodiment of the present invention.

FIG. 2 shows a schematic block diagram drawing of a second embodiment of the invention. FIG. 2 has a similar configuration to FIG. 1 in that it shows an inlet 120 upstream of a first filter stage 130, a second filter stage 150 downstream of the first filter stage 130, a conveyance section 140 positioned between the first and second filter stages, and a light source 160 positioned above the second filter stage 150 to detect light passing through the second filter stage 150 to a detector 170.

FIG. 2 however more clearly illustrates the three different zones of the device. The first zone is a heating zone 210. In the heating zone 210, both the inlet 120 and the first filter stage 130 are heated. The second zone is a cooling zone 220. In the cooling zone 220, the conveyance section 140 and the second filter stage 150 are cooled to condense the semi-volatile gas to particles. The third zone is the semi-volatile detection zone 230. In the semi-volatile detection zone 230, the light source 160 emits light through the second filter stage 150, onto which semi-volatile gas has condensed to particles, and detects the light transmitted through the second filter stage 150 by using a detector 170.

Unlike FIG. 1, FIG. 2 also shows an additional step of dilution of the semi-volatile gas 240 after it has passed through the first filter stage 130. Dilution of the semi-volatile gas reduces the occurrence of water condensing in the cooling zone 220. Also unlike FIG. 1, FIG. 2 shows the position of an exhaust 250 which is downstream of the semi-volatile detection zone 230. The exhaust 250 guides the gas out of the device.

Figure 3:
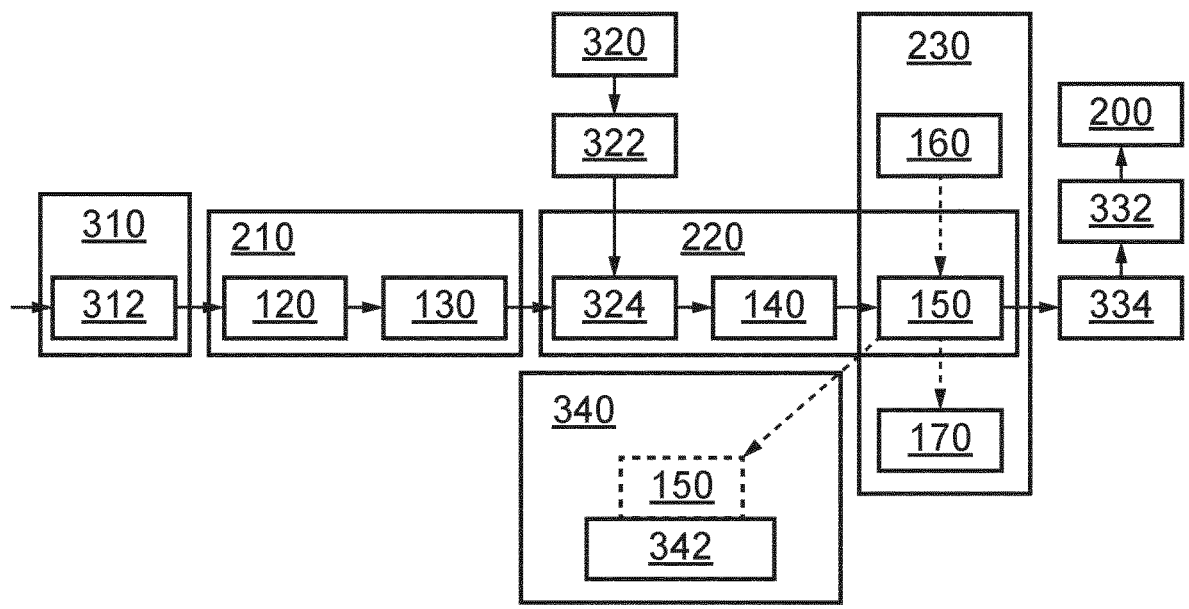
FIG. 3 is a schematic of a third embodiment of the present invention.

FIG. 3 shows a third embodiment of the present invention. Like FIG. 2, FIG. 3 also shows a heating zone 210, a cooling zone 220, and a semi-volatile detection zone 230. However, upstream of the heating zone 210, FIG. 3 shows an additional zone which is a water vapour removal zone 310. In the water vapour removal zone 310, there is a drying device 312 for removing water from the exhaust gas that enters the semi-volatile particulate matter detection device. The drying device may for example be a diffusion-based system such as a Nafion water remover. Additionally, FIG. 3 shows that once that exhaust gas has been dried by the drying device 312, and has passed through the heating zone 210, the resulting semi-volatile gas then passes into the cooling zone 220 in which further processes (compared to FIG. 2) occur. These further processes involve dilution of the semi-volatile gas to reduce the occurrence of water condensing in the cooling zone 220, and controlling the flow of semi-volatile gas through the second filter stage 150. To dilute the semi-volatile gas, a dilution gas supply 320 is connected to dilution device 324 which is positioned within the cooling zone 220 upstream of the conveyance section 140. A Mass Flow Controller (MFC) 322 is used to control the flow of semi-volatile gas and is connected to the dilution gas supply 320 and the dilution device 324.

FIG. 3 has some further additional features compared to the embodiment shown in FIG. 2. For example, a second MFC 334 is positioned downstream of the semi-volatile detection zone 230. An exhaust 200 in combination with a pump 332 is connected to the second MFC 334 to draw the semi-volatile gas through the detector device.

In addition to measuring the optical characteristics of the condensed semi-volatile matter on the second filter stage 150 in the semi-volatile detector zone 230, FIG. 3 also shows a second semi-volatile detector zone 340 for conducting external gravimetric measurements. The second filter stage 150 onto which semi-volatile material has been condensed, is removed from the first semi-volatile detector zone 230, after optical measurements have been completed, and moved into the second semi-volatile detector zone 340 where the second filter stage 150 is placed on a balance 342, to measure the mass of the condensed semi-volatile material on the second filter stage 150.

Figure 4:
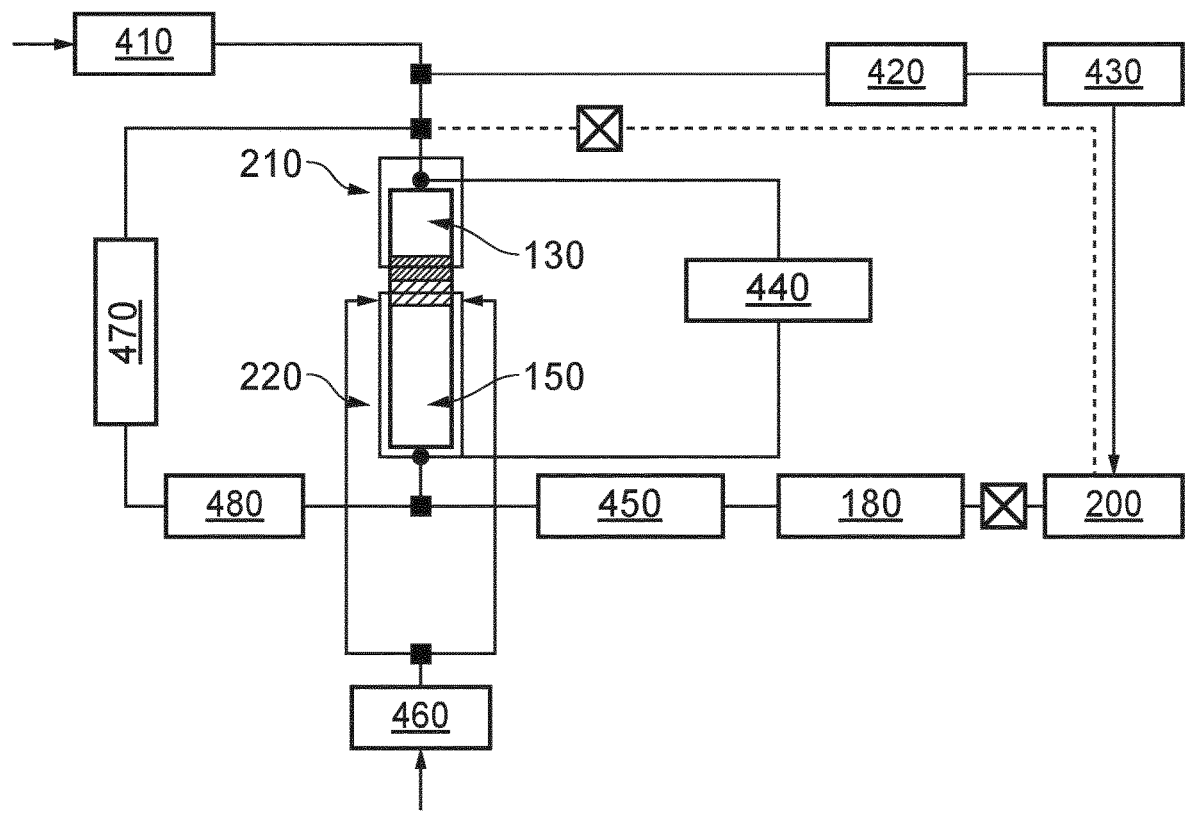
FIG. 4 is a schematic of a fourth embodiment of the present invention.

FIG. 4 shows a schematic representation of a fourth embodiment of the present invention. When the exhaust gas enters the device, it passes through a MFC 410 which controls the flow of the exhaust gas into the inlet and filters. The exhaust gas then passes into the heating zone 210. Before reaching the heating zone 210, the average diameter of particles in the exhaust gas can be identified using a Differential Mobility Analyser (DMA) 420 and a Condensation Particle Counter (CPC) 430. Once the exhaust gas passes into the heating zone 210, it is heated before it reaches the first filter stage 130. Only semi-volatile vapour passes through the heated first filter stage 130 into the cooling zone 220, where the second filter stage 150 is positioned. A differential pressure measurement device 440 is connected to the heating and cooling zone 210, 220, so that it measures the differential pressure across the device. A second MFC 450 is positioned downstream of the second filter stage 150 to help control the flow of the gas through the filters. The second MFC 450 is connected to a vacuum pump 180 and an exhaust 200 to additionally guide gas through the filters and away from the device. A third MFC 460 is positioned between the heating zone 210 and the cooling zone 220. A reference filter 470 is connected upstream of the heating zone 210 and downstream of the cooling zone 220 in a parallel stream of flow from the device in order to be used for direct comparison with the second filter stage 150. The second filter stage 150 and the reference filter 470 are identical and both gas flows are equal in terms of volumetric flow rate. A fourth MFC 480 is connected downstream of the reference filter 470.

Figure 5:
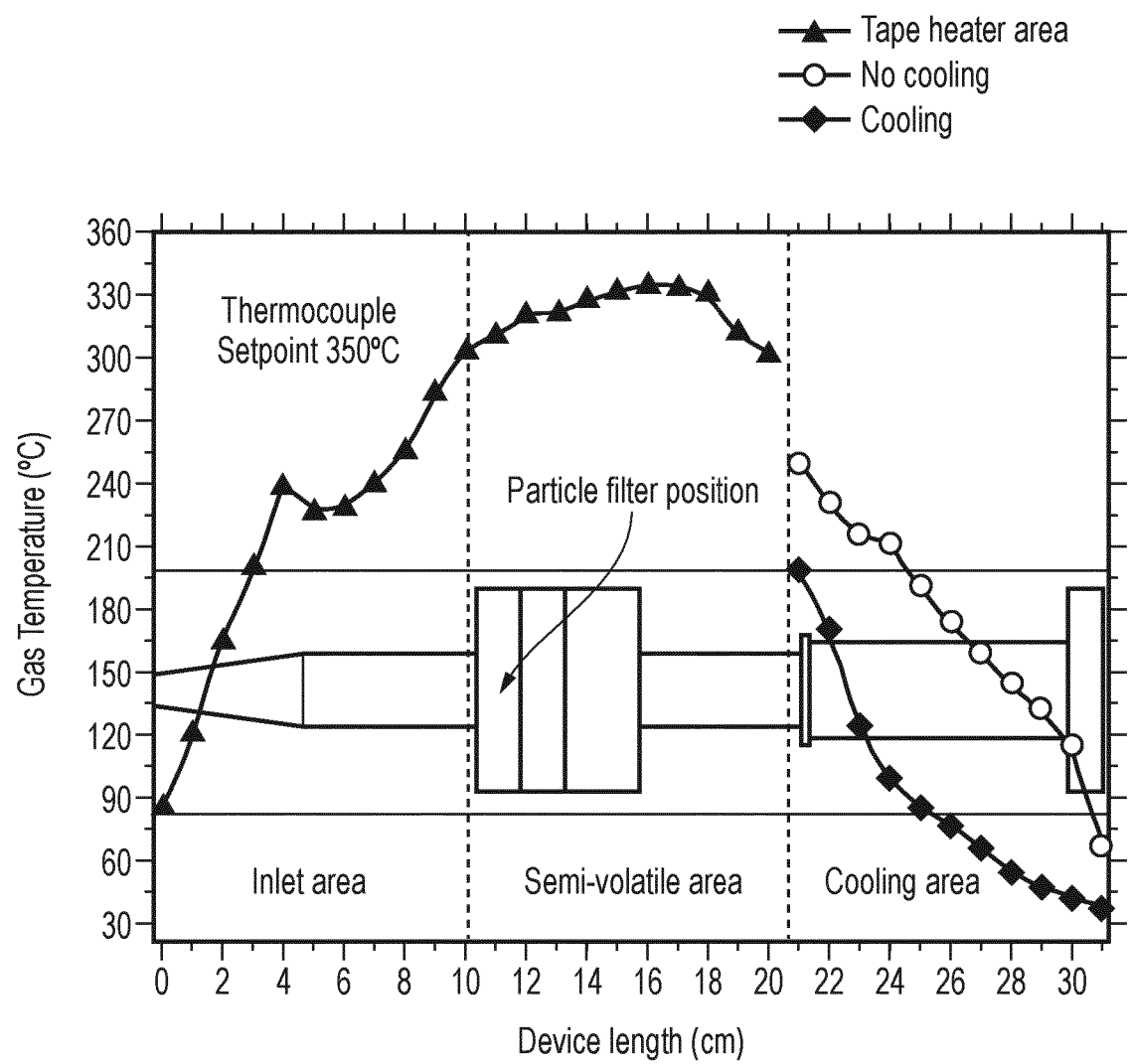
FIG. 5 is an experimental temperature profile of an embodiment of the present invention.

FIG. 5 shows an experimental temperature profile for an embodiment of the present invention. The temperature profile shows the temperature of the exhaust gas on the y-axis, and the device length on the x-axis from the inlet of the device to the second filter stage. The temperature profile is divided into three parts. The first part is an inlet area which covers a distance of between 0 and 10 cm from the entrance of the device. The second part is a semi-volatile area which covers a distance of between 10 and 21 cm from the entrance of the device. In the semi-volatile area is the first filter stage, which is positioned between 10 and 12 cm from the entrance. The third part is the cooling area which covers a distance of 21 to 31 cm from the entrance. The cooling area comprises the conveyance section and the second filter stage.

Tetracontane vapour ($C_{40}H_{82}$) was used as a semi-volatile species source in the following experiments. By varying the initial heating temperature of tetracontane vapour, the average diameter of the produced particles could be adjusted between 70 and 300 nm, as was experimentally verified using a combination of DMA and CPC. The hydrocarbon vapour was diluted in nitrogen with a flow rate of 2 lpm. Then the flow was directed into the inlet of the device. An axial sheath flow of 1 lpm was used in order to prevent hydrocarbons from condensing on the interior walls of the conveyance section.

In a first experiment, the inlet area and semi-volatile area were heated using a 150 W band tape heater and the temperature of the exhaust gas was measured. In the inlet area, the gas temperature gradually increases as it travels between 0 and 4 cm along the device, from approximately 80° C. to 240° C. Between 4 cm and 6 cm along the device, there is a drop in gas temperature down to about 230° C. As the gas travels further down the device, the temperature begins to increase again, reaching a temperature of approximately 350° C. close to the first filter stage. The temperature is relatively uniform, around 350° C., near the first filter stage, which forms the required conditions for volatisation before the first filter.

In a second experiment, the cooling of the gas in the cooling area was measured when the device was (i) actively cooled, and (ii) not actively cooled. When the device was actively cooled, the rate of temperature decrease of the gas is more pronounced over the distance of 21 to 24 cm from the entrance, compared to the device when it was not actively cooled. Beyond a distance of 24 cm, the gas temperature in the actively cooled device then reduces more gradually, until it reaches a temperature of approximately 30° C. In contrast, when the device is not actively cooled, the rate of temperature decrease remains relatively stable between 21 cm to 30 cm. However, when the gas touches the second filter stage (at a position between 30 cm and 31 cm on the graph of FIG. 5), the temperature of the gas rapidly decreases down to a temperature of approximately 65° C.

Figure 6:
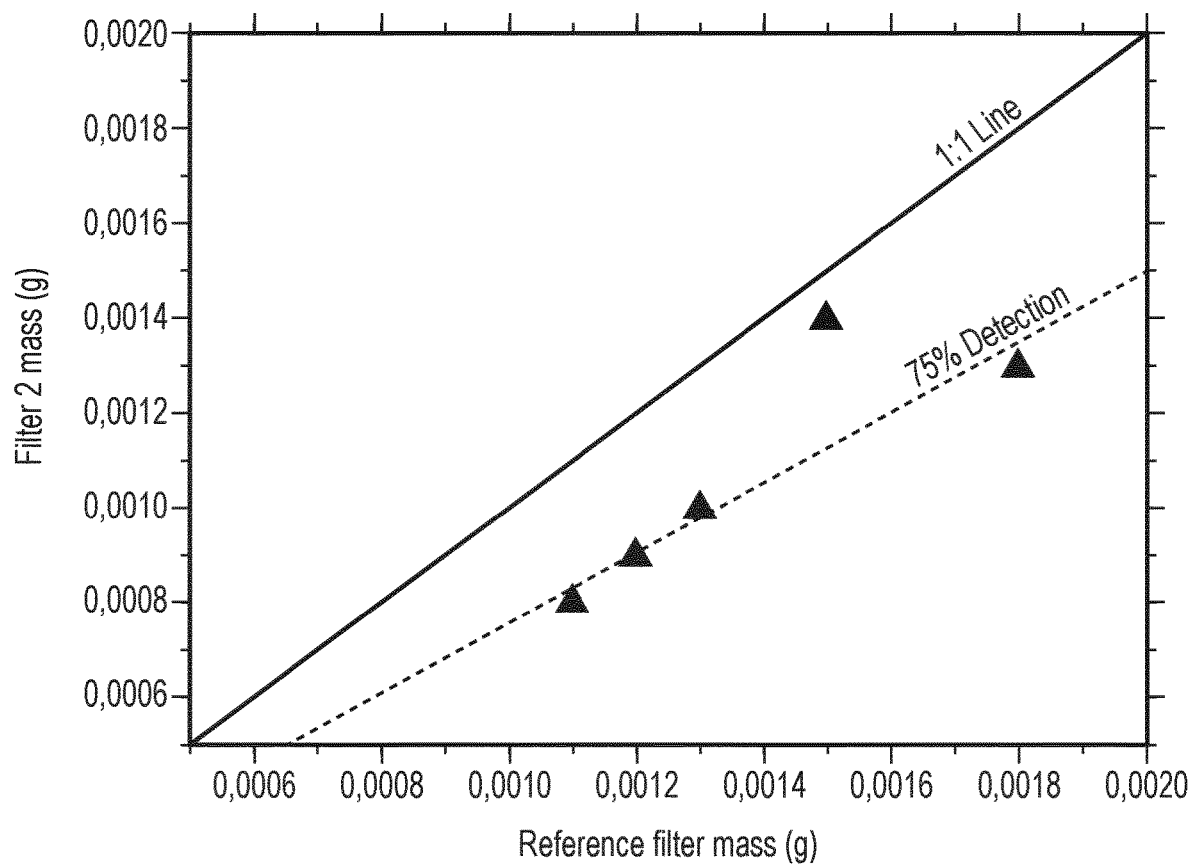
FIG. 6 is a scatter graph showing experimental data of the detected mass of the semi-volatile species collected.

FIG. 6 is a scatter graph showing experimental data of the detected mass of the semi-volatile species on the second filter stage on the y-axis, and the detected mass of the semi-volatile species on a reference filter (such as the one shown in FIG. 4) on the x-axis. The reference filter was placed in a parallel stream of flow from the device in order to be used for direct comparison with the second filter. The filters were identical and both flows were equal in terms of volumetric flow rate. The difference between the mass values of the two filters is an indication of the mass of the hydrocarbons that were condensed on the walls of conveyance section. In other words, the ratio of the detected mass of semi-volatiles species on the second filter to the mass of the semi-volatiles species on the references filter can be considered as an efficiency parameter of the device. In the case where the mass of the semi-volatile species collected on the surface of the second filter equals the corresponding measured mass on the reference filter surface, then this means that all the amount of hydrocarbons passed through the heating zone and the cooling zone of the device without any condensation on the stainless steel tube walls of the conveyance section and the efficiency is considered as 1.

Each experimental point on the graph represents one run of the device where the mass of the reference filter and the second filter are directly compared. Overall, FIG. 6 demonstrates that the detected mass of semi-volatile material on the second filter is close to the detected mass of the reference filter. This is an indication that the main fraction of the produced semi-volatiles were collected on the surface of the second filter. For example, in the first experimental point in FIG. 6, the collected mass on the second filter stage was 0.0008 g whereas the collected mass on the second filter stage was 0.0011 g, thus 75% of the semi-volatiles material was collected at the outlet of the device. An optimised device does not have to have 100% transmission at all points, but if there is to be a loss this should be a robust, predictable and consistent loss to ensure that adequate corrections can be applied to the raw measurements obtained from the device. Therefore poor accuracy in mass collection can be corrected so long as there is high precision of mass collected.

Figure 7:
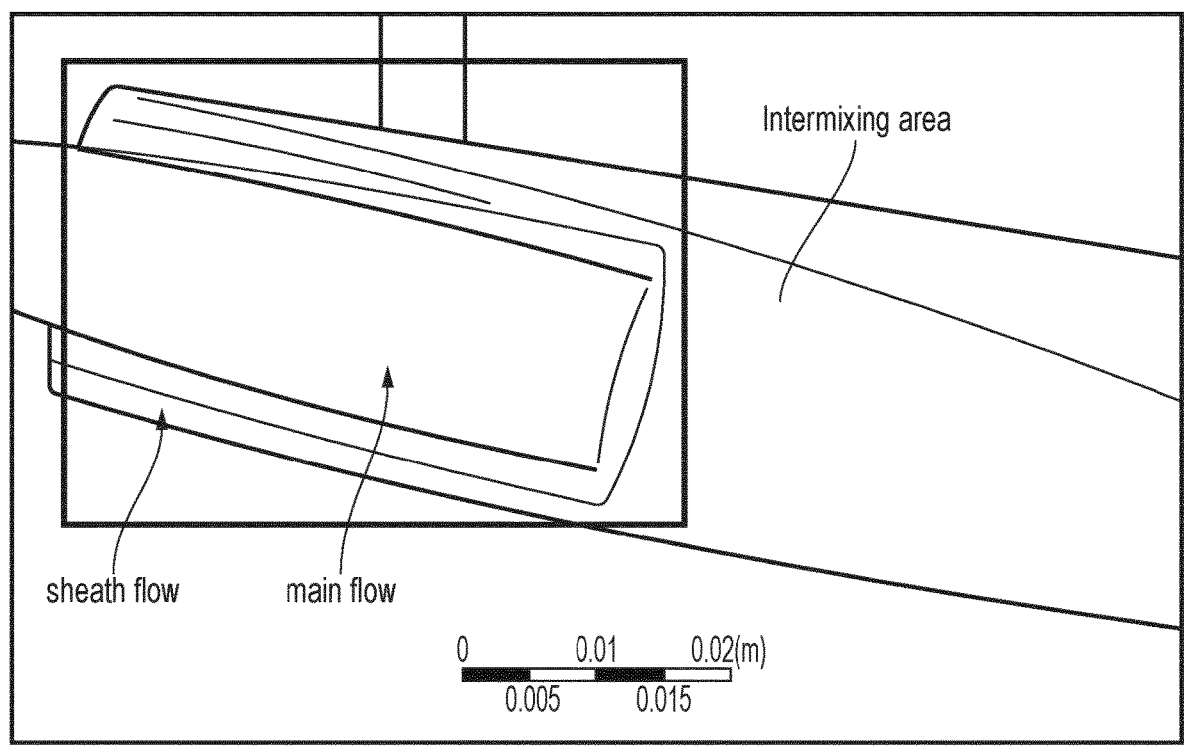
FIG. 7 is a computer model showing the geometry of part of the detection device and the gas flows within it.

FIG. 7 represents a computer model showing the geometry of part of the detection device and the gas flows within it. The model was created using ANSYS R18 Flow. FIG. 7 shows a main flow of gas through the centre of the device tube, a sheath flow along the sides of the device tube, and an intermixing area in which both main flow and sheath flow are mixed.

Figure 8:
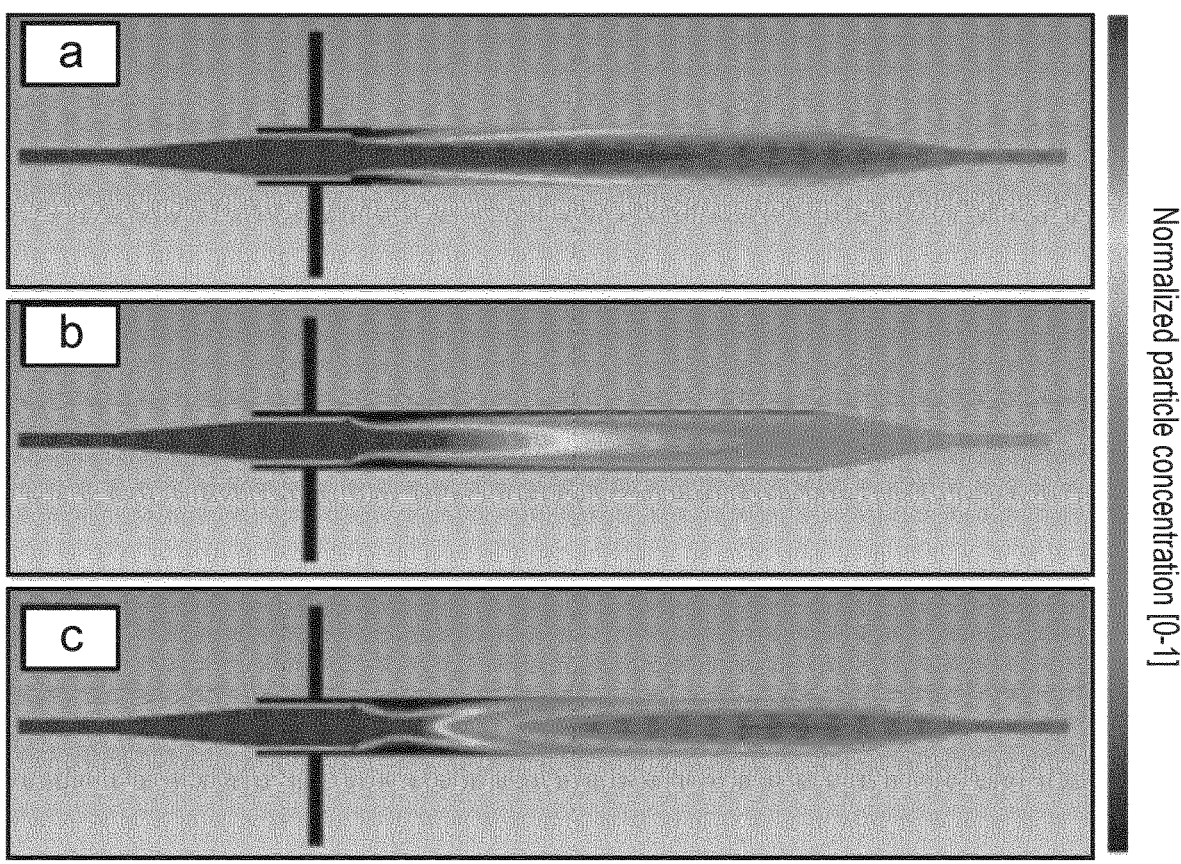
FIG. 8 is a series of computer simulations showing the effect of increasing sheath flow rate on normalised semi-volatile particle concentration.

FIG. 8 is a series of computer simulations showing the effect of increasing sheath flow rate on normalised semi-volatile particle concentration. The main flow was set on the order of 1 lpm in combination with a low sheath flow rate of 0.1 lpm for FIG. 8a), a moderate sheath flow rate of 1 lpm for FIG. 8b), and a high sheath rate of 2 lpm for FIG. 8c). FIG. 8a) shows a strong main flow. As the sheath flow is increased, as shown in FIG. 8b), the main flow becomes weakened. A thin layer of sheath flow forms along the entire length of the device tube, thus effectively protecting the tube inner wall area from condensation. As the sheath flow is further increased, as shown in FIG. 8c), the main flow is disrupted and diluted. This leads to evaporation and under sampling of the second filter.

There now follows an explanation of further experimental work carried out in order to exemplify features of the invention.

As mentioned above, the semi-volatile particulate matter detection device may include a Fourier Transform Infrared (FTIR) detector in order to correlate the value of the amount of captured semi-volatile material on the filter with the response of the FTIR system. [Alternative embodiments may include other forms of spectroscopy such as NDIR, optionally at wavelengths ranging from UV to IR.]

A series of 1 inch diameter glass fibre filters were used at the second filter stage of the semi-volatile particulate matter detection device. The condensed semi-volatile vapour was detected as a result of vaporization of heated solid Tetracontane [$CH_3(CH_2)_{38}CH_3$]. During the experiment the temperature of the second filter stage was about 20° C. The amount of material collected by the filter was measured by a gravimetric method, weighting the filter before and after the experiment. For sampling, the procedure that is presented above in relation to FIG. 6 was followed. According to that a reference filter was placed in a parallel stream of flow from the device for direct comparison with the sample filter and calibration.

Figure 9:
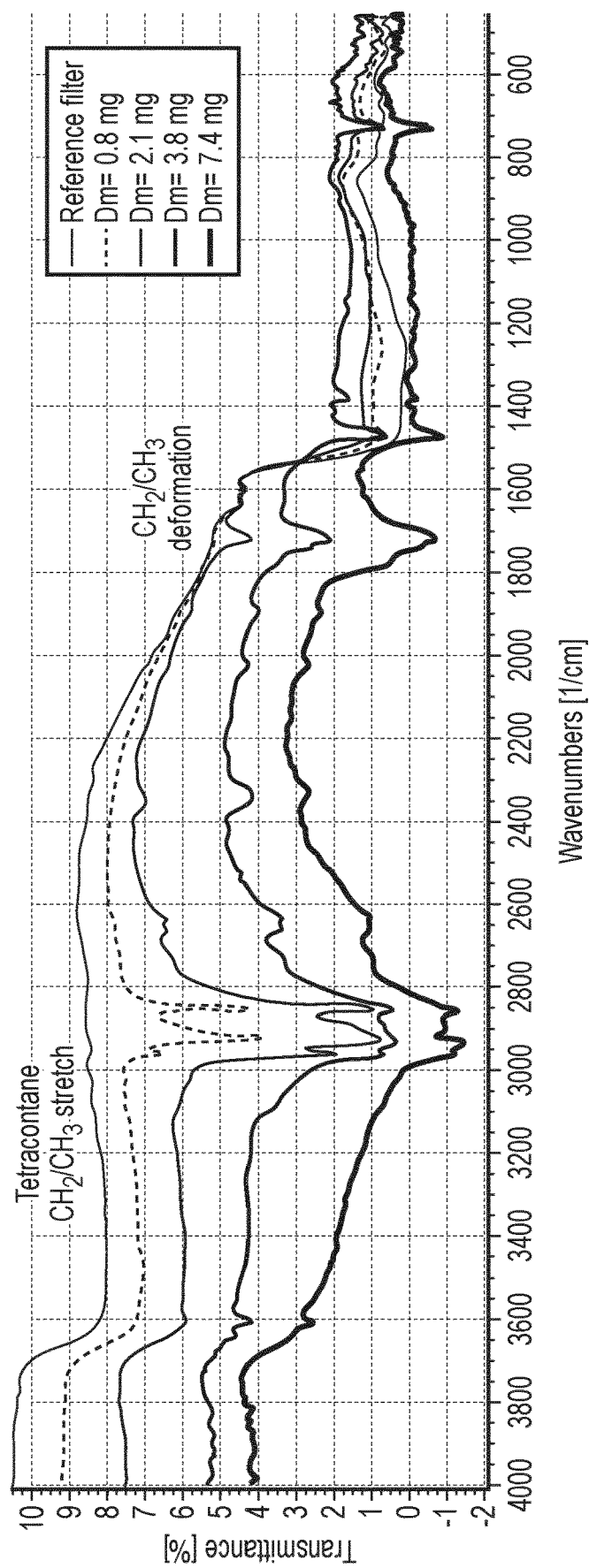
FIG. 9 shows Fourier Transform Infrared (FTIR) spectra for filters with different collected semi-volatile mass.

A PerkinElmer Spectrum 100 FT-IR system was employed to measure the mass of material on the filters as a stand-alone measurement from weighing the filters. Sample filters with collected mass of 0.8 mg, 2.1 mg, 3.8 mg and 7.4 mg were examined and the FTIR response was recorded in FIG. 9 along with an unused, new filter reference curve. In all cases of used filters the typical absorption peaks that are characteristic also for Tetracontane FTIR spectra were observed at 2850, 2920, 2954 cm$^{-1}$ ($CH_2$ and $CH_3$ stretching modes) and at 1464 cm$^{-1}$ (a $CH_3$ asymmetric bending mode).

Figure 10:
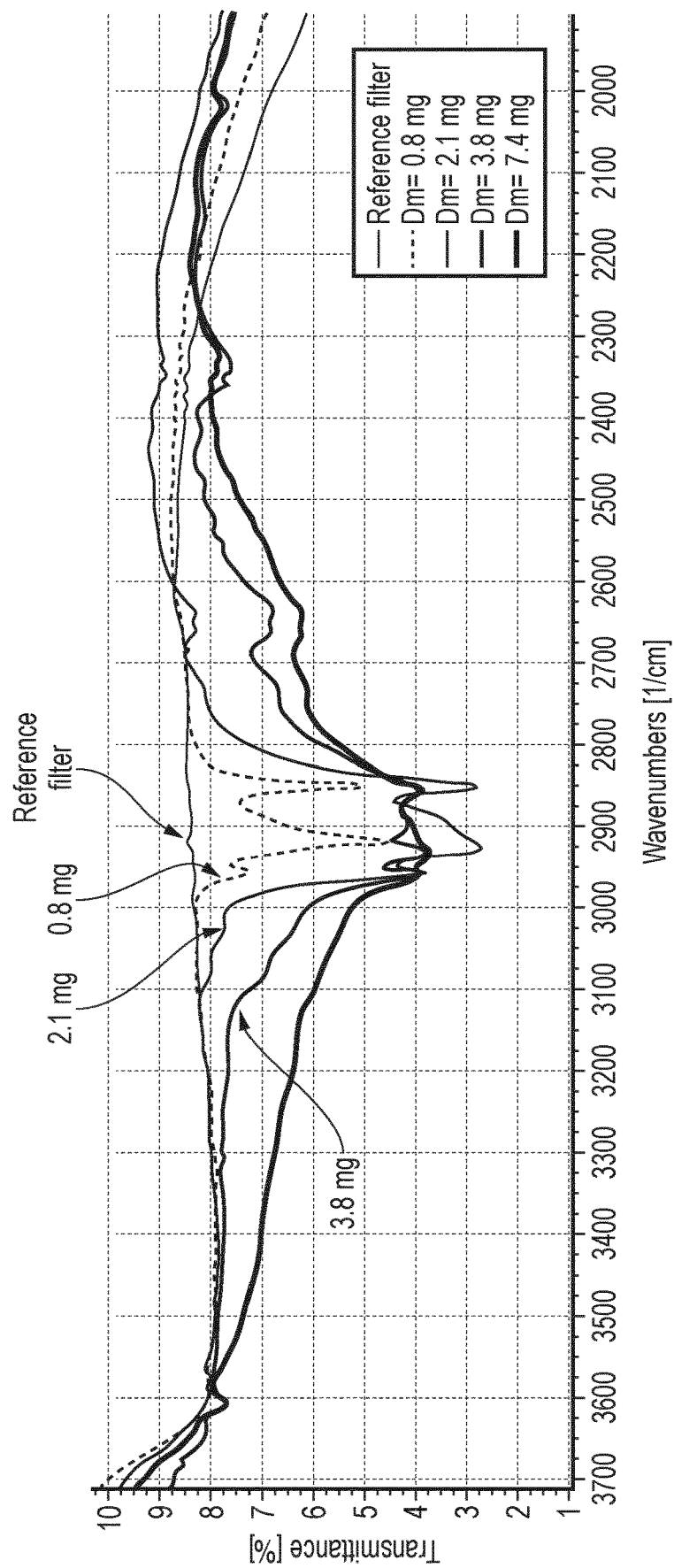
FIG. 10 is an FTIR graph around the $CH_2$ and $CH_3$ stretching modes peak area.
Figure 11A:
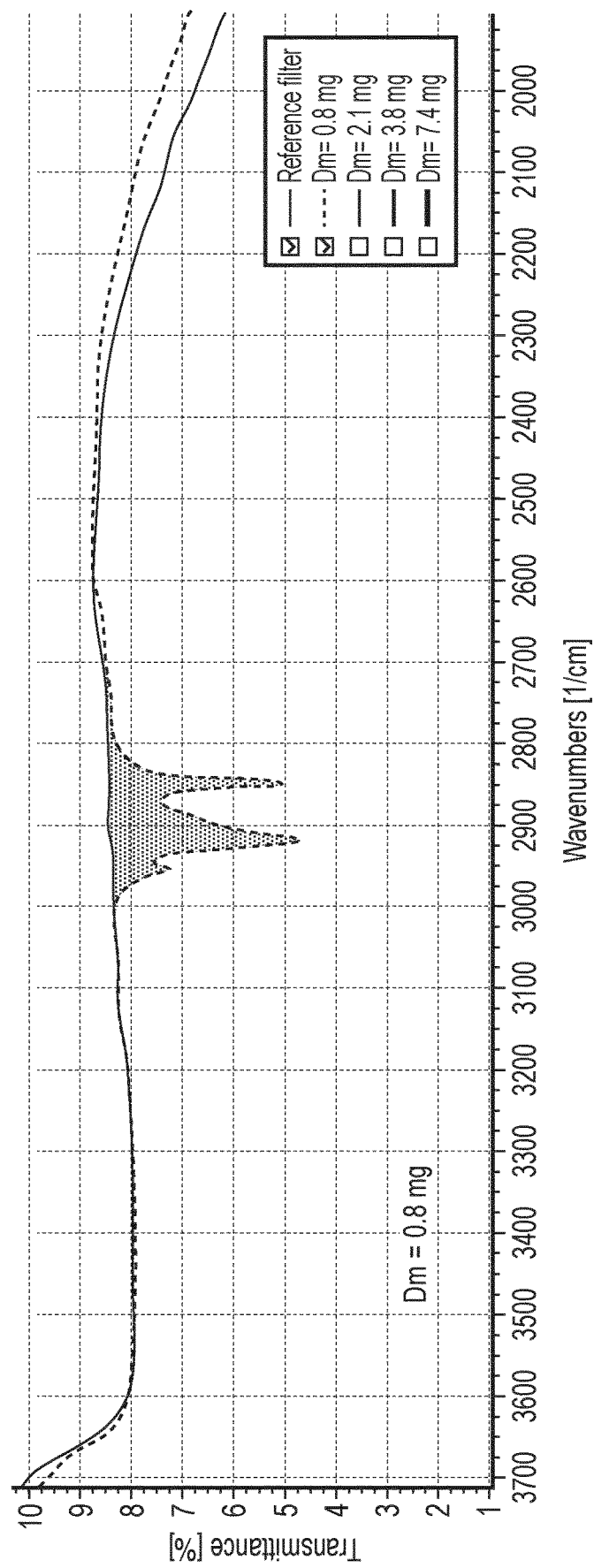
FIGS. 11A, 11B and 11C are comparative graphical representations of an integral of the surfaces defined between the curves of the response of the reference filter and the experimental samples.
Figure 11B:
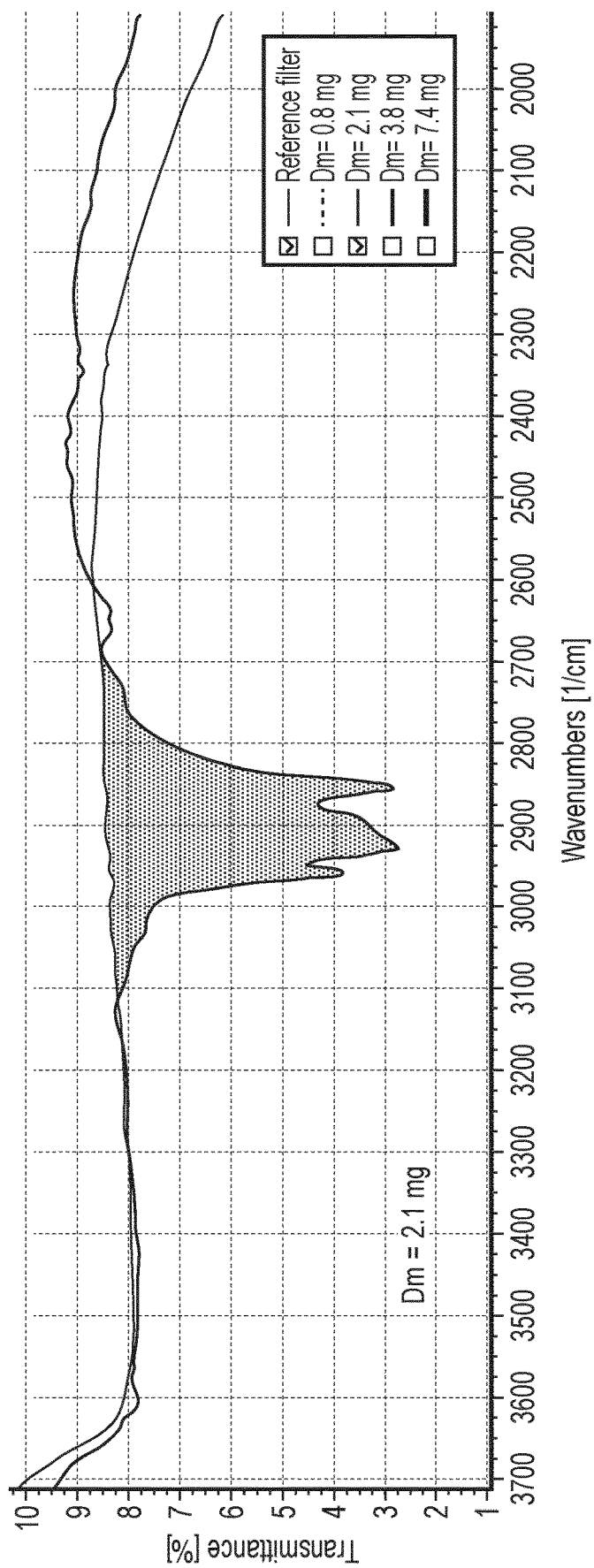
Figure 11C:
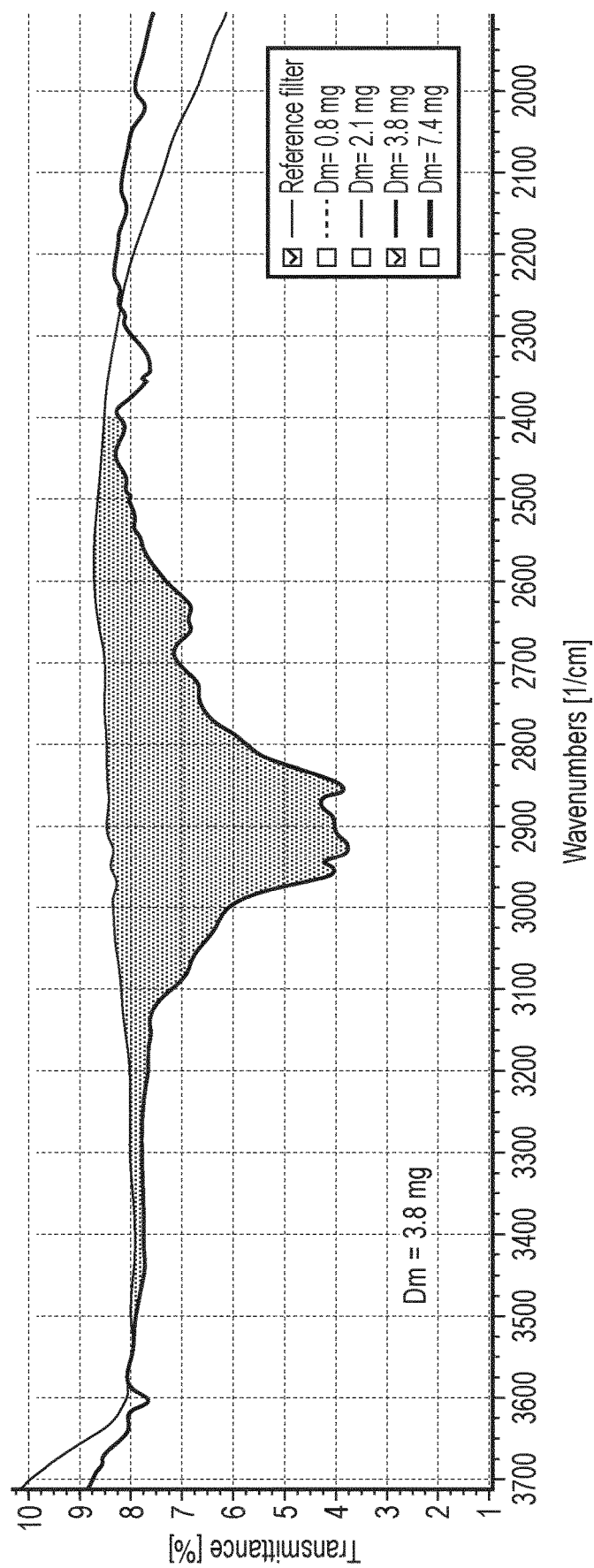
Figure 12:
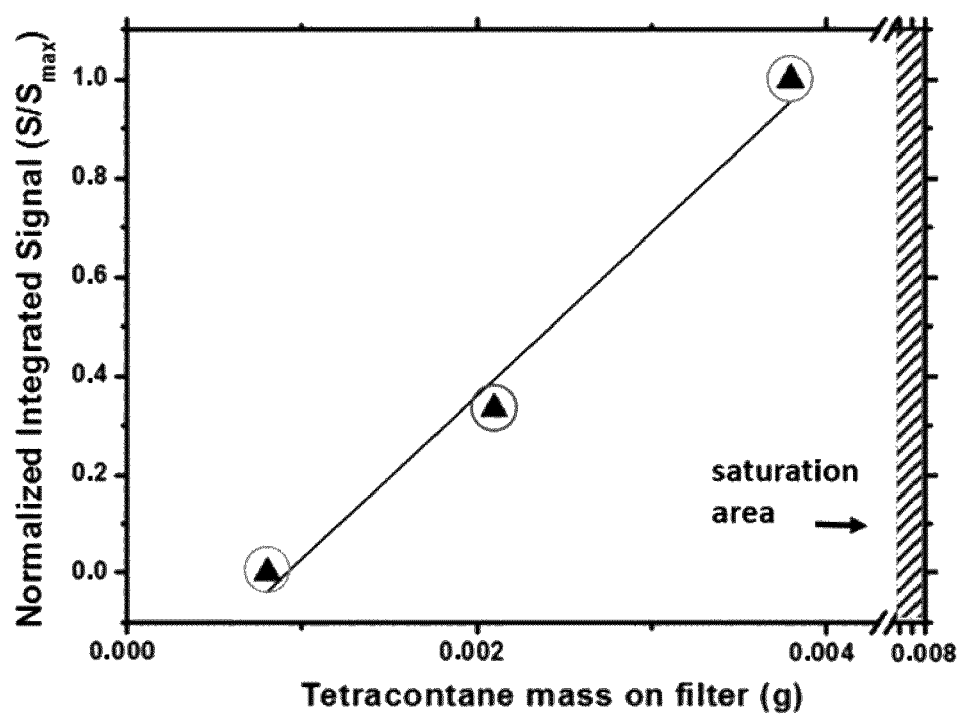
FIG. 12 is a graph of the relative integrated signal ratio of the FTIR response versus the collected semi-volatile mass on the used filter.

FIG. 10 shows the area of interest around the peaks that were allocated to $CH_2$ and $CH_3$ stretching modes. The integrals of the surfaces between the reference curve of the unused filter and each one of the variable collected semi-volatile mass filters were defined based on this graph. The integrated signal was calculated in all cases as schematically shown in FIG. 11, where the area between the curves was greyscale colour filled. In order for the relative change of the integrated signal area to be comparable between different series of measurements an integrated signal normalization was applied. The defined area for each filter (S—integrated Signal in arbitrary units) was divided by the maximum integrated signal area in the series of measurements for the specific sample ($S_{max}$ in arbitrary units). The output was expressed in a percentage mode allowing for comparisons in the same scale of axis (Y axis between 0, 1). A linear behaviour was observed between the collected mass on the filter and the integrated signal arising from the relative FTIR response in the area up to 40 mg in the X axis, as it shown by the linear regression fit in FIG. 12. The area where the FTIR response was saturated due to the amount of the collected material is presented using an axis break. The expected operational window of the device lies in the linear area of the graph.

Figure 13:
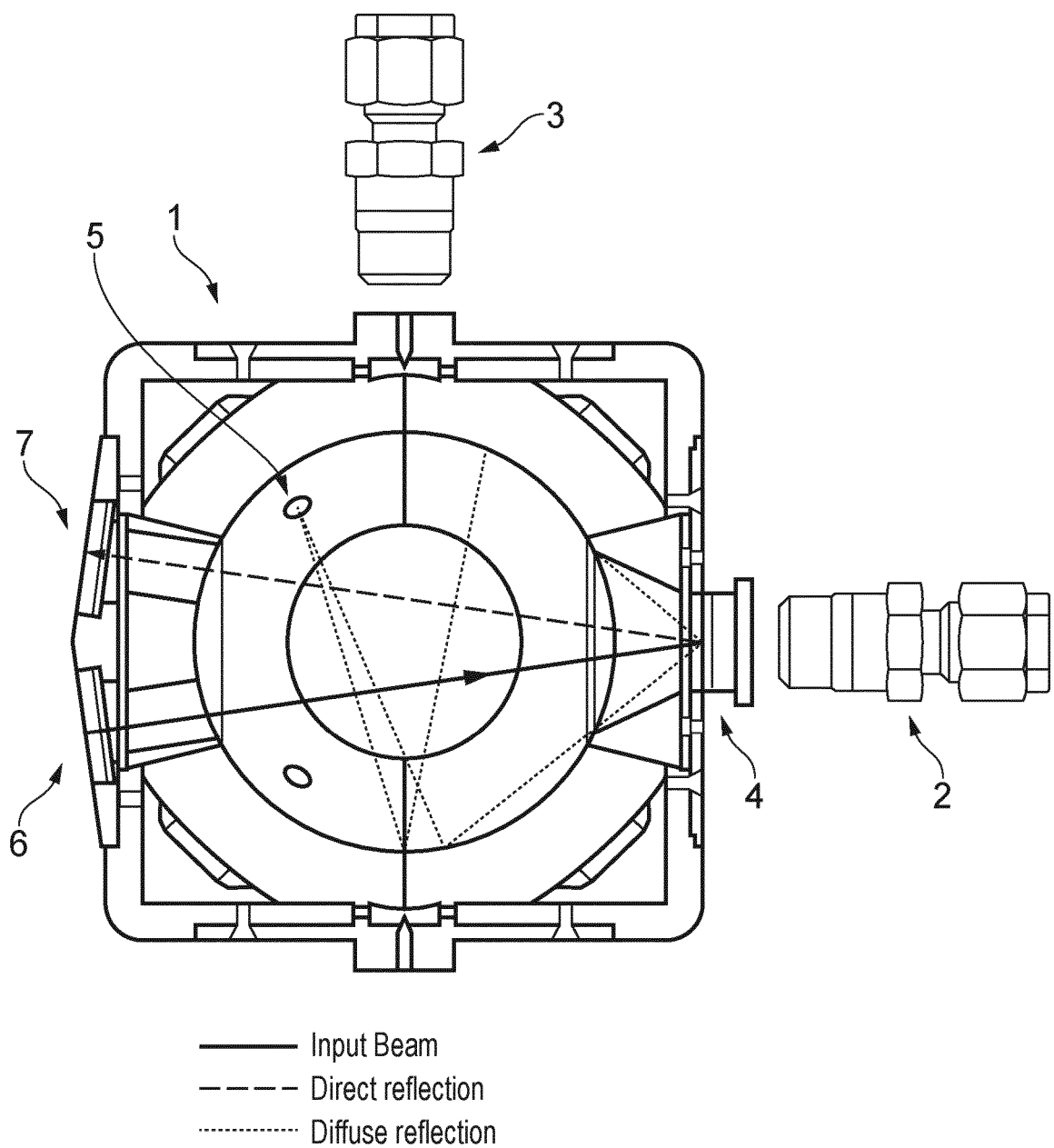
FIG. 13 is a schematic showing the modified implemented Integrated Sphere. 1. Integrated Sphere, 2. Inlet, 3. Outlet, 4. Sample, 5. 5 mm port, 6. Light source, 7. Detector

In a modification of the embodiments discussed above, an incorporation of a FTIR detector may be considered in a configuration including an Integrating Sphere as a proposed solution for providing an amplified signal, suitable for real time measurement of collected mass. In this approach an Integrated Sphere is included in the experimental setup after the second filtration stage to collect the direct and diffuse reflection of the sample, as it is shown in FIG. 13. Integrated sphere surface is considered as an ideal Lambertian scatterer, where light falling on the surface is evenly scattered in all directions, leading to efficient measurements of combined diffuse and specular reflectance. This allows for uniform detection of reflectance even for inhomogeneous samples and isotropic detection for samples with preferred reflection orientations.

In FIG. 13, reference number 1 shows the integrating sphere, with inlet 2, outlet 3. The sample is located at reference number 4. Light source 6 and detector 7 are positioned as shown, along with 5 mm port 5.

In FIG. 13, the flow is directed from the right hand side to the left and consequently the collected mass is detected from the back side of the filter. In order to demonstrate the viability of this arrangement, the experimental procedure described above with reference to FIGS. 9 to 12 was repeated but carried out for the back side of the selected filters. The FTIR response was recorded in FIG. 14.

Figure 14:
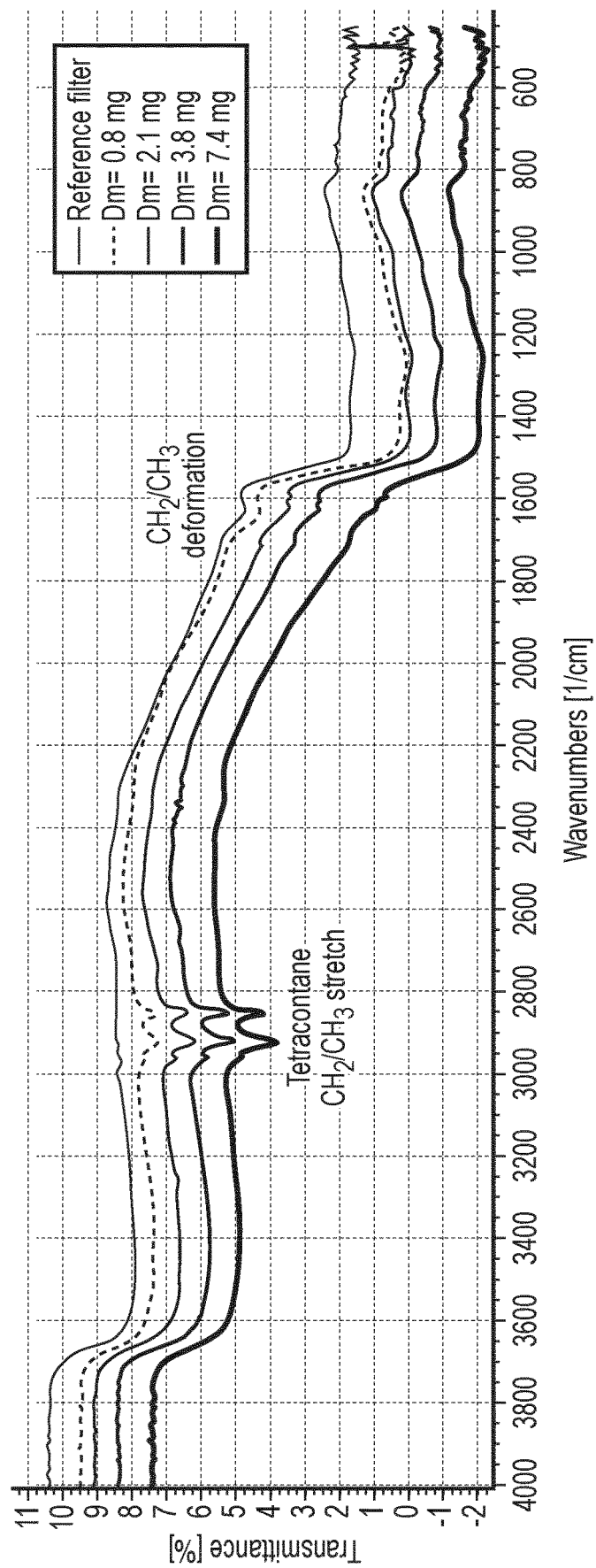
FIG. 14 shows Fourier Transform Infrared (FTIR) spectra for the back side of the filters with different collected semi-volatile mass.

The back sides of filters with collected mass of 0.8 mg, 2.1 mg, 3.8 mg and 7.4 mg were examined and the FTIR response is shown in FIG. 14 where the unused filter was used as a reference.

Figure 15:
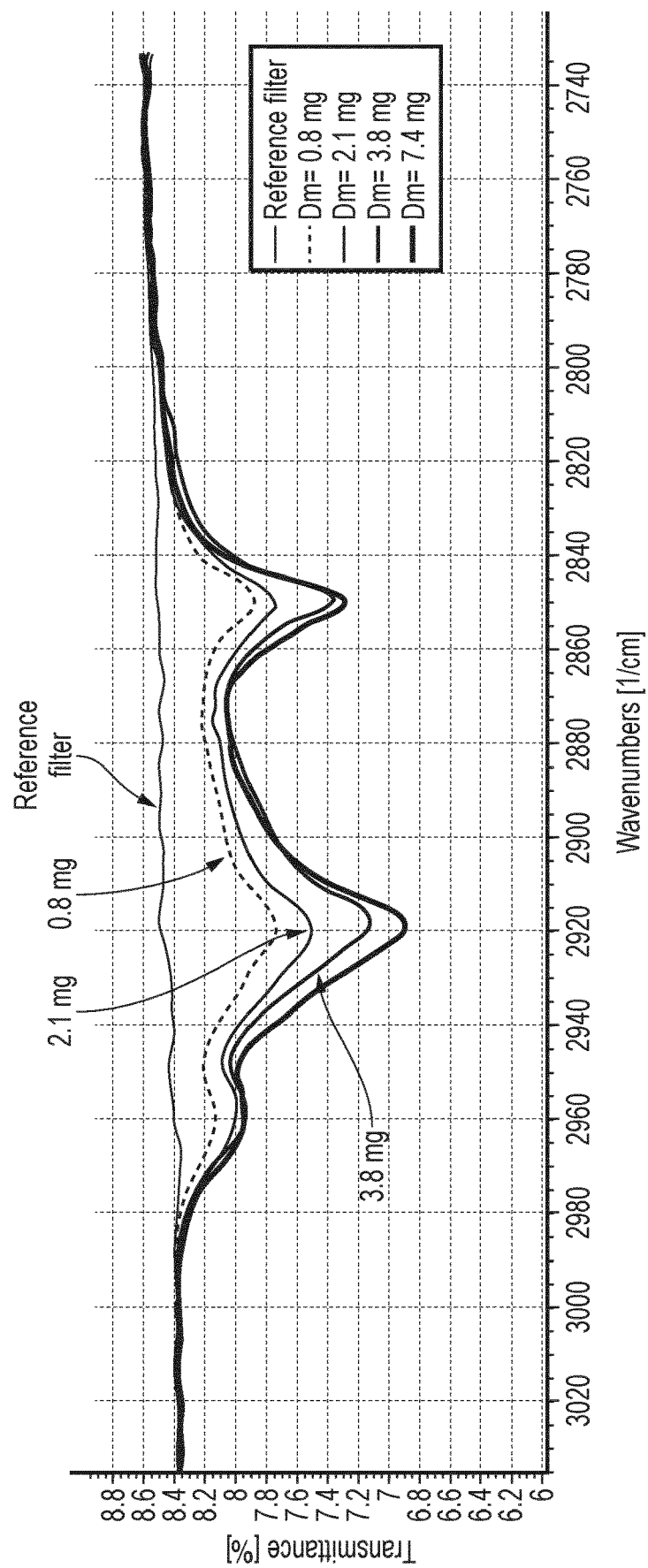
FIG. 15 is an FTIR graph around the $CH_2$ and $CH_3$ stretching modes peak area.
Figure 16A:
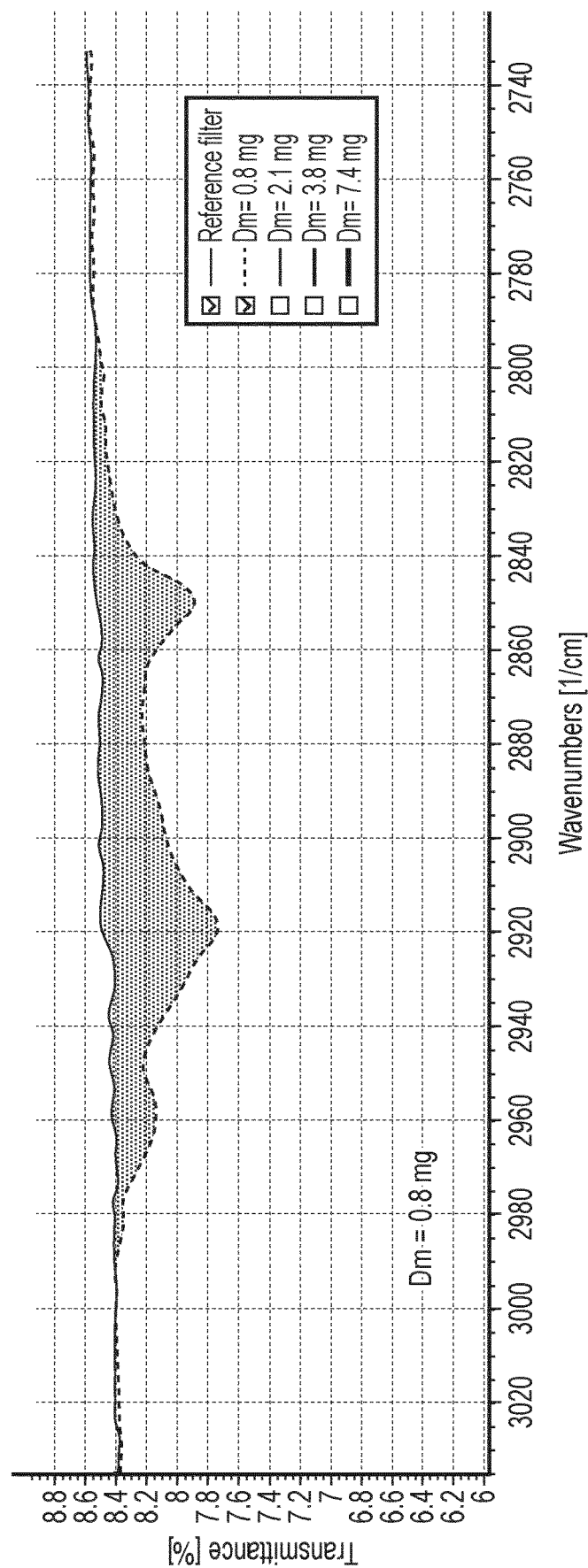
FIGS. 16A, 16B and 16C are comparative graphical representations of an integral of the surfaces defined between the curves of the response of the reference filter and the experimental samples.
Figure 16B:
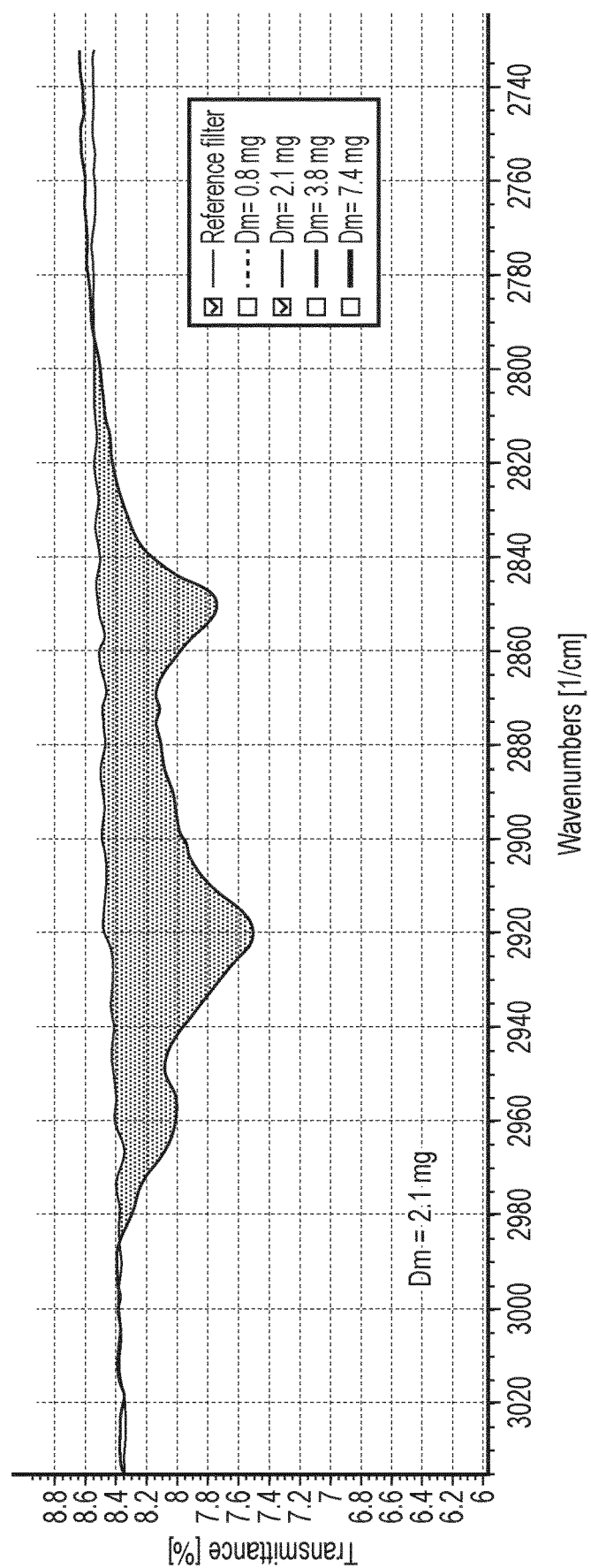
Figure 16C:
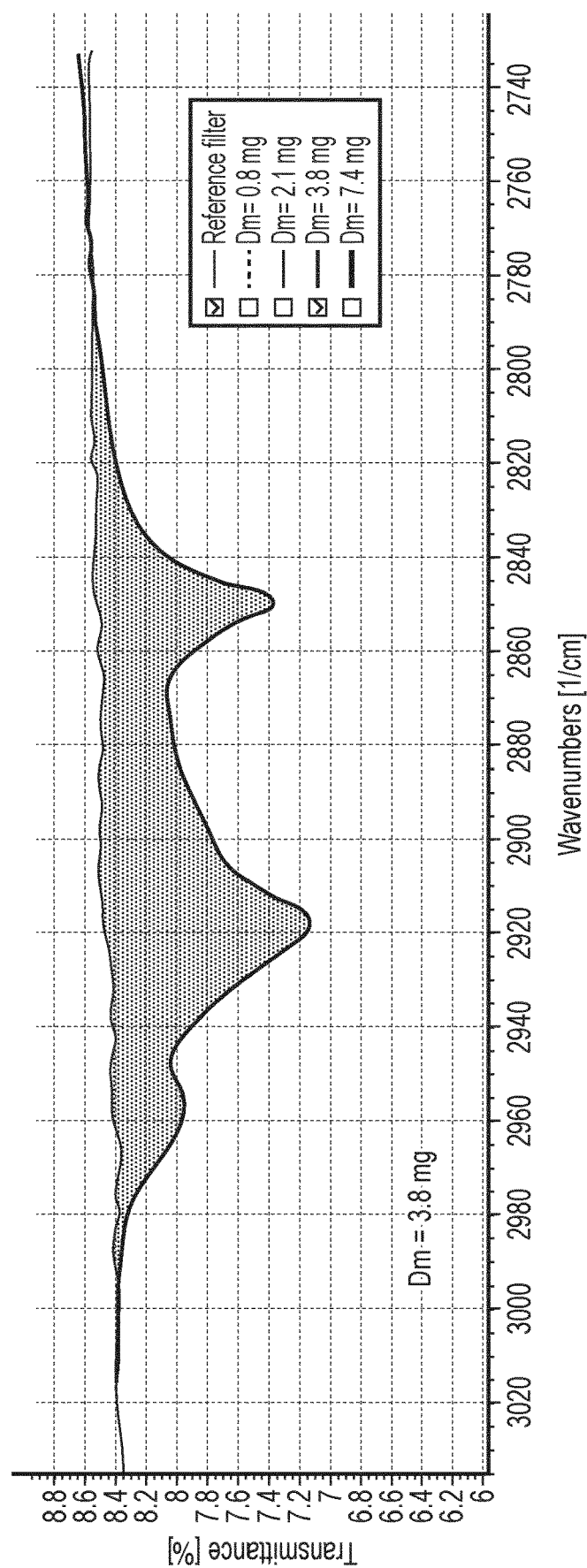
Figure 17:
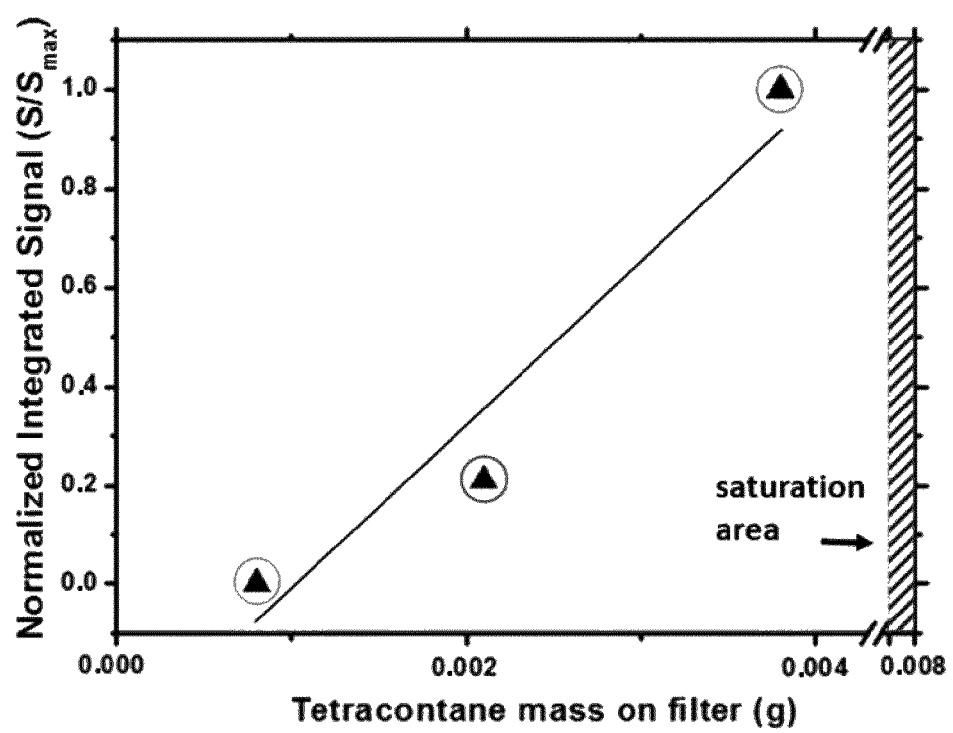
FIG. 17 is a graph of the relative integrated signal ratio of the FTIR response versus the collected semi-volatile mass on the back side of the used filter.

As for FIG. 10, FIG. 15 shows the area of interest around the main peaks. The integrated surfaces were also calculated for FIG. 15 and are presented graphically in FIGS. 16A, 16B and 16C. The results are plotted in FIG. 17 as the normalized integrated signal value with the collected semi volatile mass detected from the back side of each sample filter. As reported with respect to FIG. 12, a linear behaviour is also observed in FIG. 17 in the part of the graph before the saturation area, thus indicating a linear correlation of the collected semi-volatile mass and the FTIR response, supporting the approach towards a robust, compact apparatus with optical detection for in situ real time measurement.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

REFERENCES

A number of publications are cited above in order to more fully describe and disclose the invention and the state of the art to which the invention pertains. Full citations for these references are provided below. The entirety of each of these references is incorporated herein.

[1] M. H. Forouzanfar, L. Alexander, H. R. Anderson, V. F. Bachman, S. Biryukov, M. Brauer, et al., Global, regional, and national comparative risk assessment of 79 behavioural, environmental and occupational, and metabolic risks or clusters of risks in 188 countries, 1990-2013: a systematic analysis for the Global Burden of Disease Study 2013, Lancet. 386 (2015) 2287-2323. doi:10.1016/S0140-6736(15)00128-2.

[2] D. W. Dockery, C. A. Pope, X. Xu, J. D. Spengler, J. H. Ware, M. E. Fay, et al., An Association between Air Pollution and Mortality in Six U.S. Cities, N. Engl. J. Med. 329 (1993) 1753-1759. doi:10.1056/NEJM199312093292401.

[3] C. A. Pope III, R. T. Burnett, M. J. Thun, et al., Lung cancer, cardiopulmonary mortality, and long-term exposure to fine particulate air pollution, JAMA. 287 (2002) 1132-1141. doi:10.1001/jama.287.9.1132.

[4] A. Seaton, D. Godden, W. MacNee, K. Donaldson, Particulate air pollution and acute health effects, Lancet. 345 (1995) 176-178. doi:10.1016/50140-6736(95)90173-6.

[5] HEI Review Panel, Understanding the Health Effects of Ambient Ultrafine Particles, Heal. Eff. Inst. (2013) 122. http://pubs.healtheffects.org/view.php?id=394.

[6] L. C. Renwick, K. Donaldson, A. Clouter, Impairment of Alveolar Macrophage Phagocytosis by Ultrafine Particles, Toxicol. Appl. Pharmacol. 172 (2001) 119-127. doi:10.1006/TAAP.2001.9128.

[7] G. Oberdorster, E. Oberdörster, J. Oberdorster, Nanotoxicology: An Emerging Discipline Evolving from Studies of Ultrafine Particles, Environ. Health Perspect. 113 (2005) 823-839. doi:10.1289/ehp.7339.

[8] G. Oberdörster, Z. Sharp, V. Atudorei, A. Elder, R. Gelein, W. Kreyling, et al., Translocation of Inhaled Ultrafine Particles to the Brain, Inhal. Toxicol. 16 (2004) 437-445. doi:10.1080/08958370490439597.

[9] F. Rodríguez, Y. Bernard, J. Dornoff, P. Mock, Recommendations for Post-Euro 6 Standards for Light-Duty Vehicles, 2019. https://theicct.org/publications/recommendations-post-euro-6-eu

[10] Schwartz, R. E., et al. "Biogenic oxidized organic functional groups in aerosol particles from a mountain forest site and their similarities to laboratory chamber products." Atmospheric Chemistry and Physics 10.11 (2010): 5075-5088.

[11] L. D. Ngo et al, "Chemical discrimination of the particulate and gas phases of miniCAST exhausts using a two-filter collection method" Atmospheric Measurement Techniques, https://doi.org/10.5194/amt-2019-275

The invention claimed is:

1. A semi-volatile particulate matter detection device for detecting semi-volatile particulate matter in a gas flow, the device having:
a first filter stage for receiving the gas flow, the first filter stage being configured to capture particulate matter and to be heated to a temperature of at least 150° C. to volatilise semi-volatile particulate matter to produce semi-volatile vapour for passing through the first filter stage with the gas flow;
a conveyance section downstream of the first filter stage to convey the gas flow and the semi-volatile vapour;
a second filter stage configured to receive the flow from the conveyance section, wherein the temperature of the conveyance section and/or of the second filter stage is controllable so as to cause condensation of at least some of the semi-volatile vapour and collect it on the second filter stage; and
a detector for detecting at least one characteristic of the condensed semi-volatile vapour on the second filter stage.

2. The device according to claim 1 wherein the first filter stage is configured be heated to a temperature of at least 300° C.

3. The device according to claim 1 where the temperature of the conveyance section and/or of the second filter stage is controllable to be 50° C. or lower so as to cause condensation of at least some of the semi-volatile vapour condenses and is collected by the second filter stage.

4. The device according to claim 1 wherein the conveyance section is subjected to active cooling in order to reduce the temperature of the gas flow and entrained semi-volatile vapour.

5. The device according to claim 1 wherein the second filter stage is subjected to active cooling in order to reduce the temperature of the gas flow and entrained semi-volatile vapour.

6. The device according to claim 1 wherein the conveyance section is operable to provide a gas sheath around the gas flow and entrained semi-volatile vapour in order to reduce or prevent condensation of the semi-volatile vapour onto walls of the conveyance section.

7. The device according to claim 6 wherein the gas sheath is provided by introducing a gas sheath flow annularly surrounding the gas flow and entrained semi-volatile vapour.

8. The device according to claim 6 wherein the gas sheath is provided by introducing a gas through a porous wall of the conveyance section annularly surrounding the gas flow and entrained semi-volatile vapour.

9. The device according to claim 1 wherein the detected characteristic of the condensed semi-volatile vapour on the second filter stage is the mass of the condensed semi-volatile vapour.

10. The device according to claim 1 wherein the detector includes at least one of an optical detector and a mass sensor.

11. The device according to claim 1 wherein the detector includes a Fourier Transform Infrared (FTIR) detector.

12. The device according to claim 1 wherein there is provided a third filter stage, downstream of the second filter stage, wherein the second and third filter stages are configured to be at different temperatures in order to capture different semi-volatiles.

13. The device according to claim 1 wherein the device comprises an inlet section which is subjected to water vapour removal using a diffusion based drying approach/device.

14. A method for detecting semi-volatile particulate matter in a gas flow, the method including the steps:
conducting the gas flow to a first filter stage, the first filter stage capturing particulate matter from the gas flow and the first filter stage being heated to a temperature of at least 150° C. to volatilise semi-volatile particulate matter to produce semi-volatile vapour which passes through the first filter stage with the gas flow;
conveying the gas flow and the semi-volatile vapour along a conveyance section downstream of the first filter stage;
receiving the flow at a second filter stage, wherein the temperature of the conveyance section and/or of the second filter stage is controlled so as to cause condensation of at least some of the semi-volatile vapour onto the second filter stage; and
detecting at least one characteristic of the condensed semi-volatile vapour on the second filter stage.

15. The method according to claim 14 wherein the gas is an exhaust gas from a combustion process.

16. The method according to claim 15, wherein the exhaust gas consists of air and one or more of: hydrocarbons, sulphur compounds, nitrates, secondary organic aerosols, and incidental additional species.

* * * * *